United States Patent [19]

Nebelung

[11] Patent Number: 4,657,474
[45] Date of Patent: Apr. 14, 1987

[54] MOVING MEANS FOR USE IN A GLASSWARE MANUFACTURING MACHINE

[75] Inventor: Hermann H. Nebelung, Zurich, Switzerland

[73] Assignee: Emhart Industries, Inc., Farmington, Conn.

[21] Appl. No.: 572,290

[22] Filed: Jan. 20, 1984

[30] Foreign Application Priority Data

Jan. 29, 1983 [GB] United Kingdom ................. 8302502

[51] Int. Cl.⁴ ........................ B66C 23/00; F01B 21/00
[52] U.S. Cl. .................................. 414/744 A; 91/408; 92/2; 92/33; 901/22
[58] Field of Search ........................ 901/22, 25, 41, 43; 414/744, 749; 74/99 A, 99 R, 89.15; 92/31, 2, 33; 91/408-409

[56] References Cited

U.S. PATENT DOCUMENTS 3,916,701 11/1975 Butler ................................. 901/25 X
4,205,791 6/1980 Dooley ............................. 901/43 X
4,393,751 7/1983 Kelley ................................... 91/408
4,409,888 10/1983 Weyer ................................ 901/25 X

FOREIGN PATENT DOCUMENTS 428842 12/1974 U.S.S.R. ................................. 901/22
814719 3/1981 U.S.S.R. ................................. 901/22
852537 8/1981 U.S.S.R. ................................. 901/25

Primary Examiner—Carlton R. Croyle
Assistant Examiner—Theodore W. Olds
Attorney, Agent, or Firm—H. Samuel Kieser

[57] ABSTRACT

The moving means is for use in moving an operative member between an out-of-the-way position and an operative position by a movement having a linear component in a vertical direction and a rotary component about a vertical axis. A first shaft on which the operative member is mounted is movable vertically by a first piston and cylinder assembly and is in driving connection with a second shaft relative to which it can move vertically. A second piston and cylinder assembly is operable through a screw-threaded connection to cause its piston to rotate thereby rotating the second shaft and hence the first shaft about the vertical axis.

6 Claims, 2 Drawing Figures

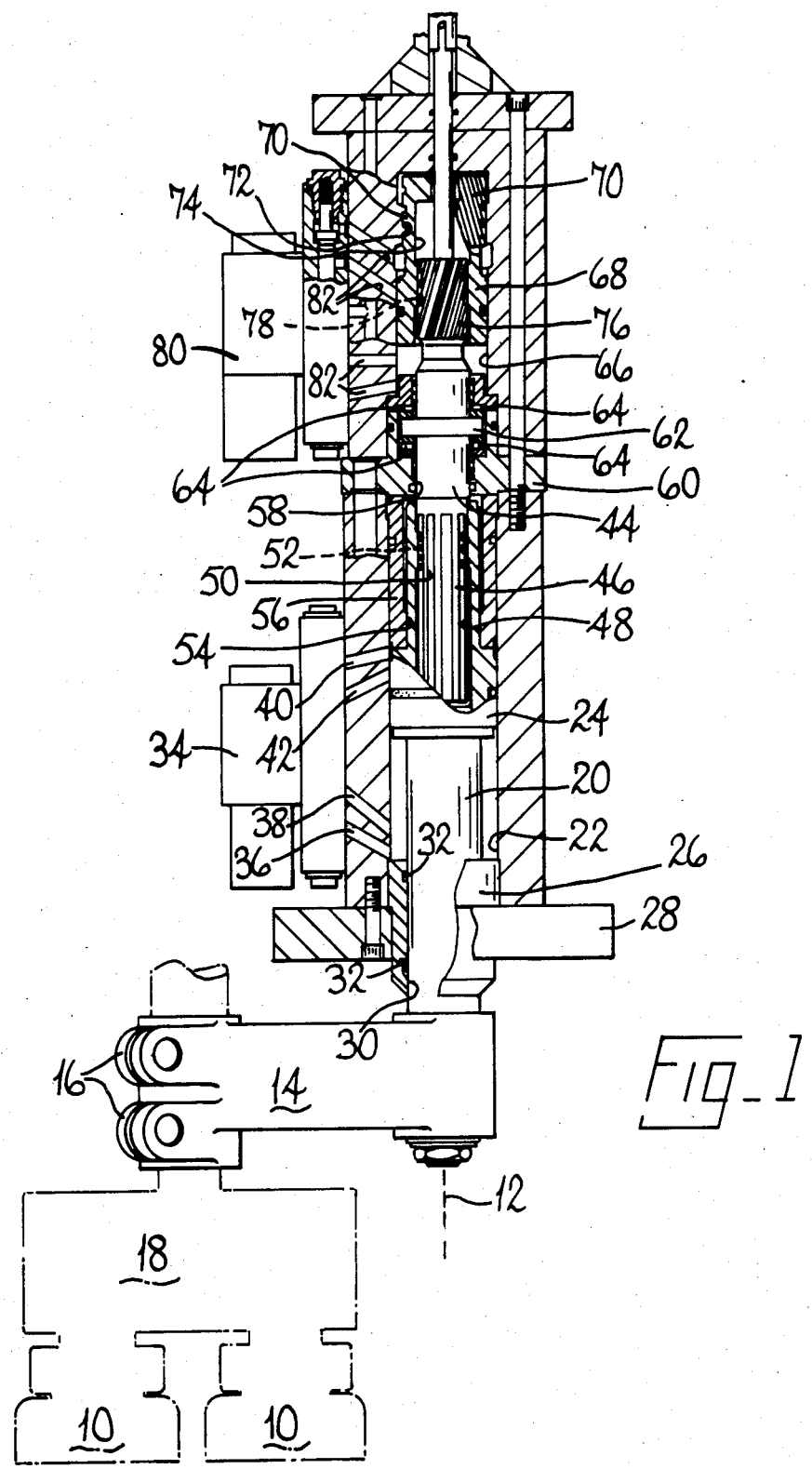
Fig_1

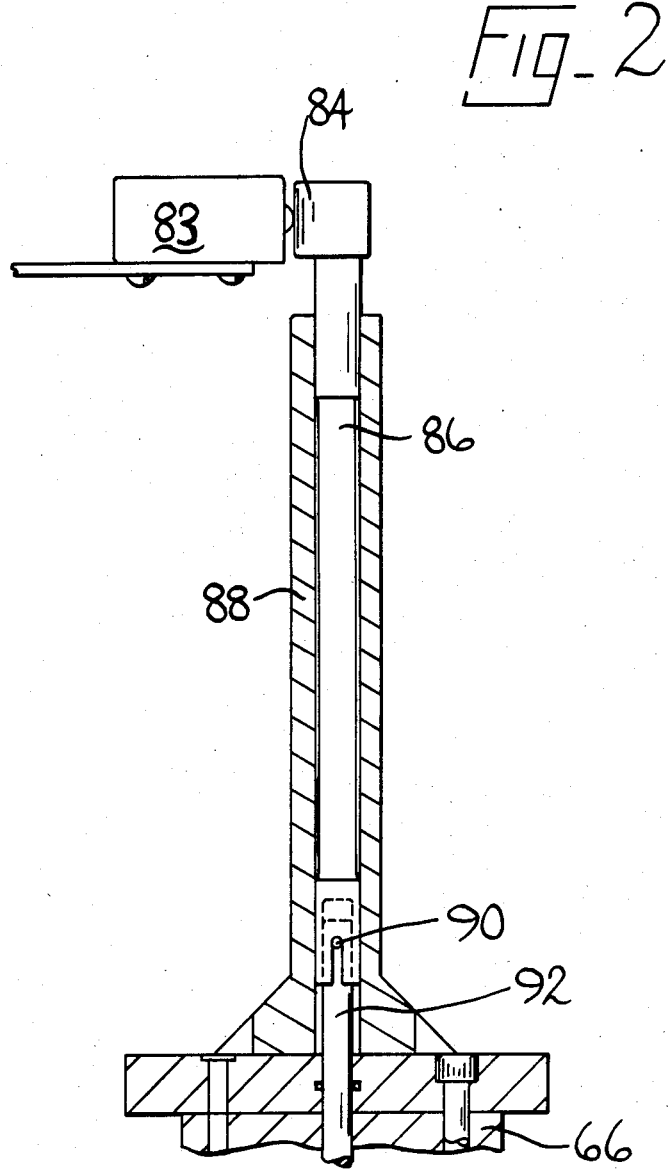

MOVING MEANS FOR USE IN A GLASSWARE MANUFACTURING MACHINE

BACKGROUND OF THE INVENTION

This invention is concerned with moving means for use in a glassware manufacturing machine for moving an operative member such as a blowhead, a funnel or a baffle.

In a glassware manufacturing machine of the so-called "individual section" type, the need arises to move operative members between out-of-the-way positions thereof and operative positions thereof in which the operative member is in alignment with an opening of a mould cavity of a mould of the machine. For example, the machine comprises a blank mould in which parisons are formed and it is necessary to move a funnel into alignment with the mould opening so that it can guide a gob of molten glass into the mould cavity and then into an out-of-the-way position to allow a baffle to be positioned on the mould. The same situation arises with regard to the baffle in relation to the blank mould and with regard to a blowhead in relation to a blow mould in which the parisons formed in the blank mould are blown into containers, the blowhead supplying the blowing air when in its operative position.

Conventional moving means for moving such an operative member in an individual section type machine comprises a piston and cylinder assembly having a vertically extending piston rod which projects in both directions from the piston. One end portion of the piston rod carries a horizontally extending arm on which the operative member is mounted. The other end of the piston rod carries a cam which is engaged in a spiral cam track. The arrangement is such that, when the piston and cylinder assembly is operated, the piston rod moves vertically causing the operative member to also move vertically. As this movement takes place, the cam track causes the piston rod to turn about its longitudinal axis thereby swinging the arm and the operative member about this axis. The operative member is thus moved in a movement which has a rotary component about the vertical longitudinal axis of the rod and a linear component in a vertical direction.

The conventional moving means described above has the disadvantage that it is not possible to vary the time relationship of the rotary and vertical components of the movement since the point reached on the arc through which the operative member moves is directly dependent on the point reached in the vertical movement. It is an object of the present invention to provide moving means in which the time relationship of the rotary and vertical components can be varied during the operation of the machine.

BRIEF SUMMARY OF THE INVENTION

The invention provides moving means for use in a glassware manufacturing machine for moving an operative member between an out-of-the-way position thereof and an operative position in alignment with an opening of a mould cavity, the operative member making a movement which has a rotary component about a vertical axis and a linear component in a vertical direction, the moving means comprising a horizontally extending arm on which the operative member is mounted, a first shaft which extends vertically and on which the arm is mounted, a first piston and cylinder assembly comprising a piston which is rigidly connected to the first shaft and a vertically extending cylinder in which the piston is movable to impart vertical movement to the first shaft and therefore to the operative member, a second vertically-extending shaft mounted for rotary movement about a vertical axis, a driving connection between the first and the second shafts operative to transmit rotary movement of the second shaft to the first shaft, the driving connection being arranged to allow vertical movement of the first shaft relative to the second shaft, and a second piston and cylinder assembly comprising a piston which is operatively connected to the second shaft so that rotary movement of the piston causes rotary movement of the second shaft, and a cylinder in which the piston is movable, there being a screw-threaded connection between the piston and the cylinder of the second piston and cylinder assembly such that, when the piston moves in the cylinder, rotary movement is imparted to the piston and therefore to the operative member via the first and the second shafts.

In a moving means in accordance with the last preceding paragraph, the two piston and cylinder assemblies can be operated independently giving the possibility of varying the time relationship of the rotary and vertical components of the movement.

The conventional moving means described above is also bulky because the cam track has to be as long in a vertical direction as the stroke of the piston. This is disadvantageous as space is very much at a premium in an individual section type machine. The moving means can be made less bulky and this is particularly true if the piston of the second piston and cylinder assembly is connected to the second shaft by means of a screw-threaded connection of opposite hand to the screw-threaded connection between the piston and the cylinder of the second piston and cylinder assembly.

Advantageously, the driving connection comprises a cylindrical portion of one of the shafts received in a cylindrical recess in the other shaft, the cylindrical portion having longitudinal slots in the outer surface thereof into which splines, formed on the wall of the recess, extend.

BRIEF DESCRIPTION OF THE DRAWINGS

There now follows a detailed description, to be read with reference to the accompanying drawings, of moving means which is illustrative of the invention. It is to be understood that the illustrative moving means has been selected for description by way of example and not of limitation of the invention.

The drawings form a longitudinal cross-section view of the illustrative moving means, FIG. 2 being an upwards continuation of FIG. 1.

DETAILED DESCRIPTION OF PREFERRED EMBODIMENT OF THE INVENTION

The illustrative moving means is for use in a glassware manufacturing machine of the individual section type for moving an operative member, in the form of a blowhead 10 of which two are moved by the illustrative moving means, between an out-of-the-way position thereof and an operative position thereof. When the blowhead 10 (FIG. 1) is in its operative position, it is in alignment with an opening in a mould cavity (not shown) and can be used to blow air into the mould cavity to cause a glass parison positioned in the mould cavity to expand to the shape of the cavity.

In moving from its out-of-the-way position to its operative position, the blowhead 10 makes a movement which has a rotary component about a vertical axis 12 and a linear component in a vertical direction. The rotary component is formed by swinging the blowhead 10 through an arc of between 90° and 70°, in particular 80°, about the axis 12.

Although the illustrative moving means is for use in moving the blowhead 10, modifications of the illustrative moving means in which the rotary component of the movement is between 60° and 50°, e.g. 55°, about a vertical axis can be used for moving a funnel or a baffle of an individual section type machine. In the case of a funnel, when the funnel is in its operative position, it is arranged to guide a gob of molten glass into a mould cavity. In the case of a baffle, the baffle is arranged, when in its operative position, to close an opening in a mould cavity and to provide a surface against which a gob of glass within the mould cavity can be formed into a parison.

The illustrative moving means comprises a horizontally extending arm 14 on which the blowheads 10 are mounted. The arm 14 extends from the axis 12 and provides a clamp 16 by which a blowhead holder 18 is clamped to the arm 14 with the blowheads 10 held by the holder 18. The illustrative moving means also comprises a first shaft 20 which extends vertically with its longitudinal axis along the axis 12. The arm 14 is rigidly mounted on a lower end portion of the shaft 20.

The shaft 20 extends vertically upwards to a first piston and cylinder assembly of the illustrative moving means. The first piston and cylinder assembly comprises a vertically-extending cylinder 22 and a piston 24 which is movable in the cylinder 22 and which is rigidly connected to the shaft 20. The cylinder 22 is closed at the bottom by an end cap 26 set into a supporting plate 28. The end cap 26 has a cylindrical passage 30 therethrough occupied by the shaft 20 with the shaft 20 being slidable through the passage 30 and with the gap between the end cap 26 and the shaft 20 sealed by seals 32. The shaft 20 is arranged to be able to turn about the axis 12 to swing the arm 14 through an arc. When the piston 24 moves in the cylinder 22, it imparts vertical movement to the shaft 20 and therefore to the blowheads 10.

Movement of the piston 24 in the cylinder 22 is brought about by introducing hydraulic fluid into the cylinder 22 by operation of a valve 34 mounted on the side of the cylinder 22. The valve 34 controls two longitudinally-spaced ports in a lower end portion of the cylinder 22, a port 36 which is always beneath the piston 24 and a port 38 arranged to be closed by the piston 24 as it reaches a lower end position thereof. The valve 34 also controls two longitudinally-spaced ports in an upper end portion of the cylinder 22, a port 40 which is always above the piston 24 and a port 42 arranged to be closed by the piston 24 as it reaches an upper end position thereof. The arrangement is such that, to move the piston 24 downwards, hydraulic fluid is introduced into the cylinder through the port 40 and can initially leave through the ports 36 and 38. However, as the piston 24 reaches its lower end position, the port 38 is closed and the fluid can only leave through the port 36. In this way, the piston 24 encounters greater resistance to its movement as it reaches its lower end position and an end portion of its motion is thereby cushioned. The ports 40 and 42 operate in similar fashion to the ports 36 and 38 but to cushion the end portion of the upwards motion of the piston 24.

The shaft 20 also extends upwardly from the piston 24 and has a driving connection with a second vertically-extending shaft 44 of the illustrative moving means. The driving connection comprises a cylindrical portion 46 of the shaft 44 which is received in a cylindrical recess 48 in the shaft 20. The portion 46 of the shaft 44 has longitudinal slots 50 formed in the outer surface thereof into which splines 52, formed on the wall of the recess 48, extend. The driving connection is operative to transmit rotary movement of the second shaft 44 to the first shaft 20 with the edges of the slots 50 engaging the splines 52 and thereby causing the shaft 20 to turn about the axis 12. The driving connection allows vertical movement of the first shaft 20 relative to the second shaft 44 since the splines 52 can move along the slots 50. Above the piston 24, the shaft 20 is guided on a bearing surface 54 of a sleeve 56 which assists both longitudinal and turning movement about the axis 12.

The shaft 44 extends upwardly through a cylindrical passage 58, provided with seals, in a plate 60 which serves to seal the upper end of the cylinder 22. Above the plate 60, the shaft 44 has an external flange 62 supported on bearings 64 for rotary movement about the axis 12. The flange 62 serves to support the shaft 44 for rotary movement and against axial movement along the axis 12.

Above the flange 62, the shaft 44 enters the cylinder 66 of a second piston and cylinder assembly of the illustrative moving means. This assembly comprises the cylinder 66 which extends vertically along the axis 12 and a piston 68 which is movable in the cylinder 66. There is a screw-threaded connection between the piston 68 and the cylinder 66 comprising splines 70 on the outside of an upwards extension of the piston 68 received in grooves 72 in the cylinder 66. The screw-threaded connection is such that, when the piston 68 moves in the cylinder 66, rotary movement is imparted to the piston 68 about the axis 12.

The piston 68 is operatively connected to the shaft 12 so that rotary movement of the piston 68 causes rotary movement of the shaft 44 so that, when rotary movement of the piston 68 takes place, the blowheads 10 have rotary movement imparted to them via the shafts 20 and 44. The operative connection between the piston 68 and the shaft 44 is screw-threaded having the same pitch but opposite handedness to the connection between the piston 68 and the cylinder 66. The piston 68 has a cylindrical recess 74 in which an upper end portion 76 of the shaft 44 is received. The portion 76 is formed with grooves that receive splines 78 extending from the wall of the recess 74.

A valve 80 similar to the valve 34 is mounted on the side of the cylinder 66 and controls four ports 82 which are arranged, in like fashion to the ports 36, 38, 40 and 42, to cause the piston 68 to move in the cylinder 66 with cushioning for the ends of its movement.

In the operation of the illustrative moving means, operation of the valve 80 causes the piston 68 to move along the cylinder 66. As the piston 68 moves the splines 70 and grooves 72 cause it to turn about the axis 12. As the piston 68 turns, the threaded connection with the shaft 44 causes the shaft 44 to turn about the axis 12 twice as much as the piston 66. As the shaft 44 turns, the shaft 20 is caused to turn also through the driving connection and the arm 14 swings moving the blowheads 10 in an arc about the axis 12.

Also in the operation of the illustrative moving means, operation of the valve 34 causes the piston 24 to move in the cylinder 22 and therefore vertical movement of the shaft 20, the arm 14 and the blowheads 10 to occur. This movement is accommodated by the splines 52 moving along the slots 50.

In order to ensure that the valve 80 is operated when the rotary component of the motion of the blowheads 10 has been completed so that the supply of fluid under pressure to the cylinder 66 of the second piston and cylinder assembly is discontinued, a sensor 83 (FIG. 2) is provided. The sensor 83 is arranged to sense two projections 84 (only one visible in drawing) positioned 80° apart on a shaft 86. The shaft 86 is mounted for rotation about the vertical axis 12 in a housing 88 mounted on top of the cylinder 66. The shaft 86 is caused to rotate by a driving connection 90 between it and an upwards projection 92 of the shaft 44 which passes through the piston 70 and the end of the piston 66. When the sensor 83 senses one of the projections 84, it causes operation of the valve 80 and the rotary component of the motion ceases.

The vertical and rotary components of the movement of the blowheads 10 can be in any desired time relationship depending on when the valves 34 and 80 are operated. It should be noted that in most cases the components will overlap.

Furthermore, the illustrative moving means is compact especially as the movement of the piston 68 produces twice as much rotary movement of the blowheads 10 because of the presence of two screw-threaded connections of opposite handedness.

I claim:

1. Moving means for use in a glassware manufacturing machine for moving an operative member between an out-of-the-way position thereof and an operative position in alignment with an opening of a mould cavity, the operative member making a movement which has a rotary component about a vertical axis and a linear component in a vertical direction, the moving means comprising a horizontally extending arm on which the operative member is mounted a first shaft extending vertically and on which said arm is mounted, a first piston and cylinder assembly comprising a piston which is rigidly connected to the first shaft and a vertically extending cylinder in which the piston is movable to impart vertical movement to the first shaft and therefore to the operative member, a second vertically-extending shaft mounted for rotary movement about a vertical axis and being coaxial with said first shaft, one of said first or second shafts being received within the other shaft, a driving connection between the first and the second shafts operative to transmit rotary movement of the second shaft to the first shaft, the driving connection being arranged to allow vertical movement of the first shaft relative to the second shaft, and a second piston and cylinder assembly comprising a piston which is operatively connected to the second shaft so that rotary movement of the piston causes rotary movement of the second shaft, and a cylinder in which the piston is movable, there being a screw-threaded connection between the piston and the cylinder of the second piston and cylinder assembly such that, when the piston moves in the cylinder, rotary movement is imparted to the piston and therefore to the operative member via the first and the second shafts.

2. Moving means according to claim 1, wherein the piston of the second piston and cylinder assembly is connected to the second shaft by means of a screw-threaded connection of opposite hand to the screw-threaded connection between the piston and the cylinder of the second piston and cylinder assembly.

3. Movinbg means according to either of claims 1 and 2 wherein the driving connection comprises a cylindrical portion of one of the shafts received in a cylindrical recess in the other shaft, the cylindrical portion having longitudinal slots in the outer surface thereof into which splines, formed on the wall of the recess, extend.

4. Moving means according to claim 1, wherein a lower end portion of the cylinder of the first portion and cylinder assembly has two ports through which fluid under pressure can leave the cylinder, the ports being spaced longitudinally of the cylinder and so arranged that, as the piston approaches a lower end position thereof, the piston closes one of the ports and thereby cushions an end portion of its motion.

5. Moving means according to claim 4, wherein an upper end portion of the cylinder of the first piston and cylinder assembly and upper and lower end portions of the cylinder of the second piston and cylinder assembly each have two longitudinally spaced ports similar to the two ports of the lower end portion of the cylinder of the first piston and cylinder assembly so that both end portions of the motion of both pistons is cushioned.

6. Moving means according to claim 1, wherein the moving means comprises a sensor arranged to sense when the rotary component of the movement has been completed and to cause supply of fluid under pressure to the second piston and cylinder assembly to be discontinued, when the rotary component has been completed.

* * * * *